Oct. 22, 1968  G. R. READ  3,406,833
SKYLINE CONVEYING DEVICE
Filed May 29, 1967  7 Sheets-Sheet 5

INVENTOR
GEORGE R. READ
BY Fetherstonhaugh & Co.
ATTORNEYS.

United States Patent Office 3,406,833
Patented Oct. 22, 1968

3,406,833
SKYLINE CONVEYING DEVICE
George R. Read, 2586 Cook St., Victoria,
British Columbia, Canada
Filed May 29, 1967, Ser. No. 641,784
26 Claims. (Cl. 212—99)

ABSTRACT OF THE DISCLOSURE

This disclosure is concerned with skyline conveying systems for timber harvesting industry and with work carriages for use in a skyline system. It described a system in which a plurality of work carriages on a single skyline may be moved from a loading position to an unloading position by utilizing an endless drive line having a flight parallel to the skyline and passing about a breakable traction drum in each carriage. The drive line can also be used to operate the loadline winch of the carriage.

Background of the invention

This invention relates to an improved skyline system and more particularly, to an improved transporting carriage of the overhead track supported type.

In the logging industry and particularly in areas where the terrain is very rugged, skyline systems are used in combination with or in place of ground vehicles to haul the logs from the cutting area to a central loading or milling station. In the main, however, known types of skyline systems are not efficient, safe or versatile, and as a result, large areas of valuable timber, which are relatively close to mills or good routes of transportation but include rough and rugged terrain, are being passed by in favour of timber standing on relatively flat ground.

In the systems now used, a single work carriage travels on each skyline between the cutting area and the central station. Because only one carriage is used, frequently work crews are left idle while waiting for the carriage to return. In some systems, the carriage in only pulled in one direction by a donkey engine, which is usually located at the home spar tree, and the carriage travels in the other direction under the influence of gravity. With these types of systems it is of course, possible to work only one slope at a time.

The control systems of known types of skyline carriages contribute greately to the inefficiency, and because of lack of control of the operation of the carriage at the work area, most known systems now used have proved very hazardous to the work crews using them.

The raising and lowering of the loadline of the work carriage utilized in some known systems is controlled entirely from the donkey engine. Since the cutting area may be several thousand feet from the donkey engine, the operator of the donkey engine cannot observe or be made aware of all of the happenings at the cutting area, which can result in serious accidents. Timing devices have been used in carriages to raise and lower the loadline, but these have also proved hazardous because the crew cannot always secure the load and stand clear before the loadline is reeled in.

In yet another system recently developed, the work crew is provided with a radio transmitter and the work carriage is provided with a radio receiver which in response to signals from the transmitter controls the loadline. Failure in the electrical circuits of the transmitter or receiver due to the rough handling to which they are subjected can cause the loadline to run out of control. Also a stray signal from another transmitter in the area can also cause the loadline to run out of control; and when this happens, it can be disastrous since it can happen completely unexpectedly. Moreover, radio transmitters and the radio receivers with all of their associated control mechanisms cannot be readily repaired in the field.

Many work carriages now in use are provided with clamping members which clamp onto the skyline to brake the work carriage against movement as heavy loads are pulled up by the loadline. It has been found that such clamping members cause severe wear to the skyline because of twisting forces applied to the skyline when the load is being pulled from either side of the carriage. Not only are the long skylines extremely expensive but failure of the skyline results in the falling of many tons of equipment into the work area and a lashing of the broken skyline.

Summary of the invention

According to the present invention there is provided a carriage which includes a frame, sheaves mounted on the frame and arranged to support the carriage from an overhead track, an endless line engaging traction drum journalled in the frame, a loadline winch means mounted in the frame, and drive means connecting the drum to the winch means. There is further provided a brake means for fixing the drum against rotation with respect to the frame, an electric motor means for actuating the brake means, a contact plate means mounted on the frame and including at least one contact terminal, the contact plate means being arranged to engage and mate with a similar plate means held stationary with respect to the track or carried by another carriage, and an electrical lead connected to the contact terminal and arranged to supply electrical energy to the electric motor means from the contact terminal.

The carriage of the present invention is utilized in a system including an overhead supporting cable, two spaced guide carriages carried by the cable and fixed with respect to the cable substantially above the two work areas, an endless drive line having a flight guided parallel to the cable between the guide carriages, a drive motor for circulating the line in either direction, and means for providing a supply of electrical energy at both work areas. Each of the guide carriages carry a contact plate having contact terminals thereon which are arranged to engage the terminals of the contact plate means of the work carriage. A separate control panel is provided at each work area and these panels are arranged to selectively supply electrical energy from the supply to the terminals of the guide carriage contact plate thereabove.

With the above described carriage and system of the present inventions, the location of the guide carriages determines the location at which the work carriage can be stopped and the loadline lowered since the disengaging of the brake means of the carriage through the control panel, stops the work carriage. The location of the guide carriages can be controlled very positively by the work crews at the working area and need not be under the control of the operators of the donkey engine. Moreover, with the above described system the work carriage is pulled in one direction when the drum is braked and the endless line is circulated in one direction, and the work carriage is pulled in the other direction when the drum is braked and the endless line is circulated in the other direction. As a result, the skyline can extend over knolls or through valleys, the direction of slope of the skyline making no difference since the carriage is positively pulled in both directions.

Preferably, clutch means is provided to drivingly connect the winch means to the drum, the clutch means being actuated by an electric motor means, and the electric motor means being controlled from the control panel through additional contact terminals on the contact plates. With this arrangement the actions of the loadline are positively controlled at the work area by one of the work crew. For example, if the brake means of the endless line drum is disengaged the work carriage remains stationary and the clutch means can be engaged to drive the winch from the rotating drum, but if the loadline runs into trouble the clutch means can be disengaged by the control panel so that the loadline is completely unaffected by any steps taken by the donkey engine operator.

Preferably the work carriage has front and rear contact plates which project from the fore and aft sides of the carriage respectively, each plate being provided with contact terminals for the brake and clutch means motors, and there are provided electrical leads connected at opposite ends to corresponding terminals of the two plates, and arranged to supply electrical energy to the brake and clutch motor means. With this arrangement a plurality of carriages can be utilized on one skyline between two guide carriages since the electrical energy provided by the contact terminals of the guide carriage can pass from contact to contact plate of the first carriage adjacent the guide carriage by way of the electrical leads of the first carriage, the second carriage which receives the energy from the contact plate of the first and by way of its electrical leads it can pass on to the third, etc.

In a preferred embodiment of the invention, the contact plates of the work carriage are each biased to a first normal position by contact plate mounting means, the plates being movable to a second engaging and mating position, and preferably there is provided a switch means arranged to be actuated by the contact plate mounting means and to cut off the supply of electrical energy from the contact terminals to the brake and clutch motor means when both of the contact plates are held in the second position. Thus, since each of the work carriages in a row of work carriages with the exception of the work carriage furthest from the guide carriage will have both of its contact plates held in their second positions, the operator of the control panel can control the work carriage furthest from the guide carriage. Therefore, this carriage can be individually loaded at the cutting area and then moved off to permit individual loading of the next carriage in line. This increases greatly, of course, the efficiency of the system.

In a specific embodiment of the invention, there is provided a first and a second coupling means fixed to the frame on the fore and aft sides of the carriage, the first coupling means being arranged to engage and become locked with a coupling means on another carriage corresponding to the second coupling means, and means carried by the frame arranged to unlock the coupling means. This arrangement permits locking of the work carriages to the guide carriage which in turn may be conveniently tied to a stump, rock or other anchoring means on the ground. Thus clamping of the carriages to the skyline is completely avoided.

*Brief description of the drawing*

In the drawings, which show an embodiment of the invention, by way of example.

*Description of preferred embodiments*

Figure 1:
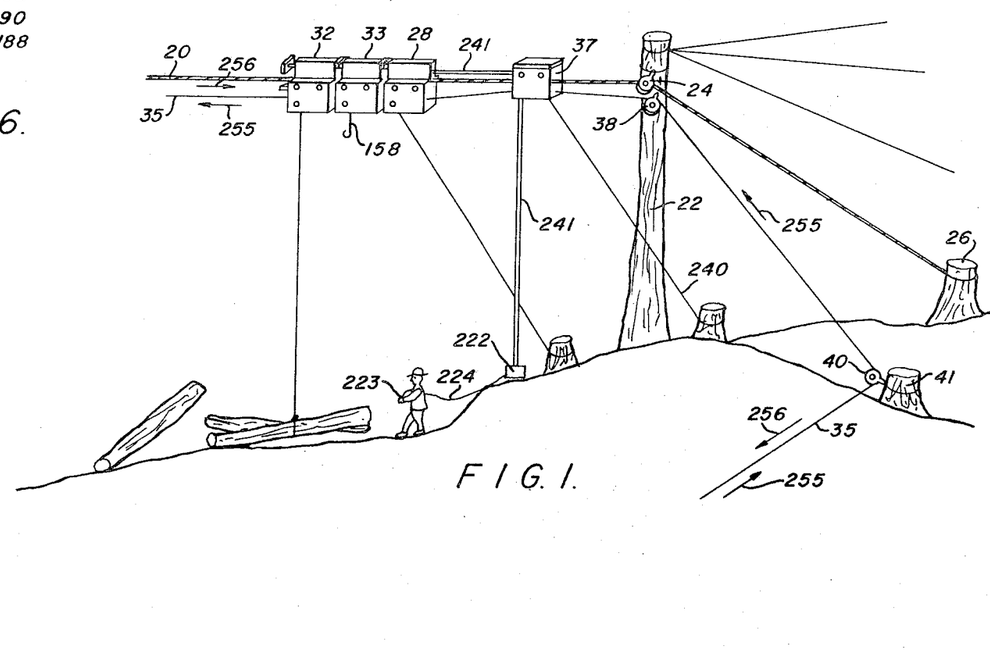
FIGURE 1 is a pictorial view of the cutting area near an outer spar tree of the system.
Figure 2:
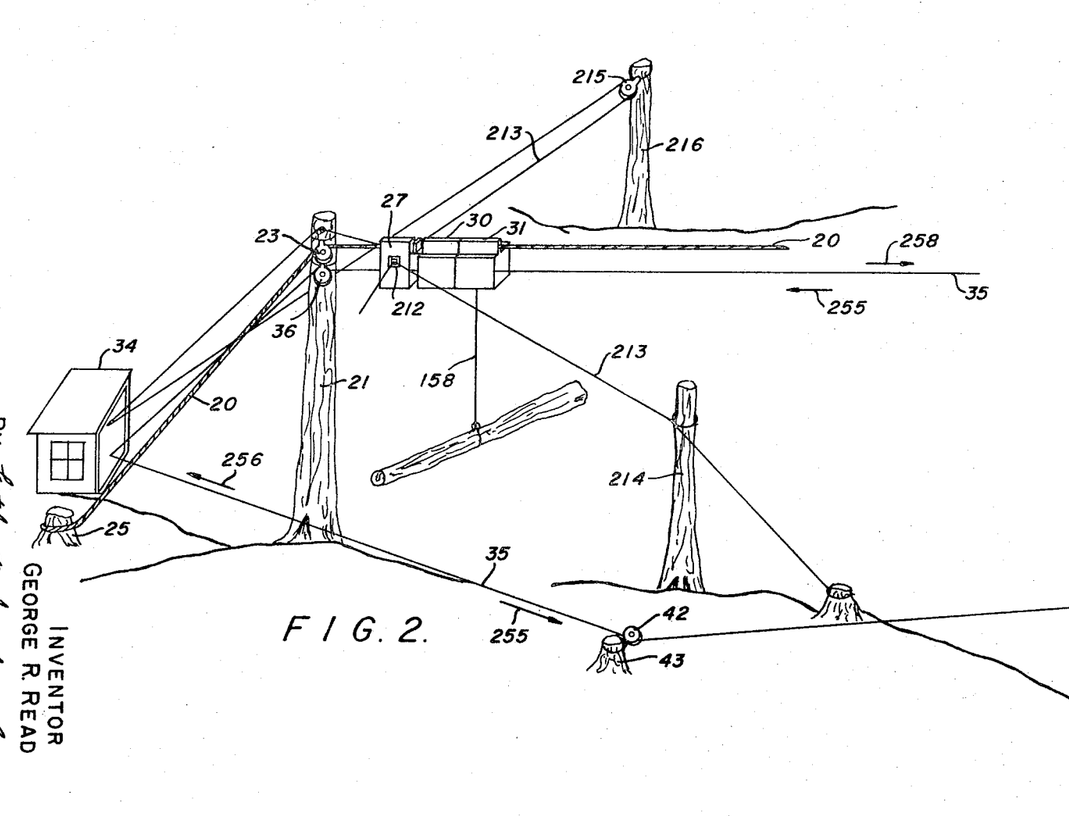
FIGURE 2 is a pictorial view of the central working area near the inner spar tree of the system.

Referring firstly, particularly to FIGURES 1 and 2, reference character 20 denotes a skyline cable which is stretched between a home spar tree 21 and an outer spar tree 22. The cable 20 passes over blocks 23 and 24 secured to the spar trees 21 and 22, respectively, near their tops, and the ends of the cable 20 are anchored around stumps 25 and 26. The cable 20 may be several thousand feet long and may be supported between the spar trees by three by-pass devices or similar supporting devices. Carried by the cable 20 near the home spar tree is a central work area guide carriage 27, and at the cutting area a guide carriage 28 is carried by the cable 20. Mounted on the cable 20 between the guide carriages 27 and 28 are four work carriages denoted by reference characters 30, 31, 32 and 33, two of which, 30, 31, are shown at the central work area and two of which, 32, 33, are shown at the cutting area. It will become apparent however, that more or less than four work carriages can be used on the single skyline cable 20.

A donkey engine (not shown) is housed in shanty 34 (see FIGURE 2). The donkey engine is connected through a reversible transmission to a large drive drum (not shown) around which endless line 35 is wound so that the endless line 35 can be circulated in either direction by the donkey engine. The endless line 35 passes over a block 36 secured to spar tree 21 just below block 23. It then passes through guide carriage 27, work carriages 30, 31, 32 and 33 and also through guide carriage 28. After guide carriage 28 the line 35 passes through an electrical line supporting carriage 37, which will be described later. The line 35 then passes over block 38 secured to spar tree 22 just below block 24, around block 40 secured to a stump 41 and then returns to the block 42 on stump 43 and goes onto the drum of the donkey engine.

Each work carriage has a main outer frame 45 (see FIGURES 3, 4 and 5) which extends for substantially the full length of the carriage and is in transverse cross-section the shape of an inverted U. The major portion of the working mechanism of the carriage is housed between the side frame members 46 and 47 of the U under the top horizontal plate 48 or the base of the U. Projecting upwardly from the centre of top horizontal plate 48 is a longitudinally extending flange 50. The flange 50 together with spaced longitudinally extending frame member 51 which is attached at either end to flange 50 (see FIGURES 3 and 4) provide a sheave mounting means. Two aligned, longitudinally spaced carriage supporting sheaves 52 and 53 are carried between flange 50 and member 51 on transversely extending axles 54 and 55, respectively. The sheaves 52 and 53 ride on top on the skyline cable 20 and thereby support the entire carriage.

Figure 3:
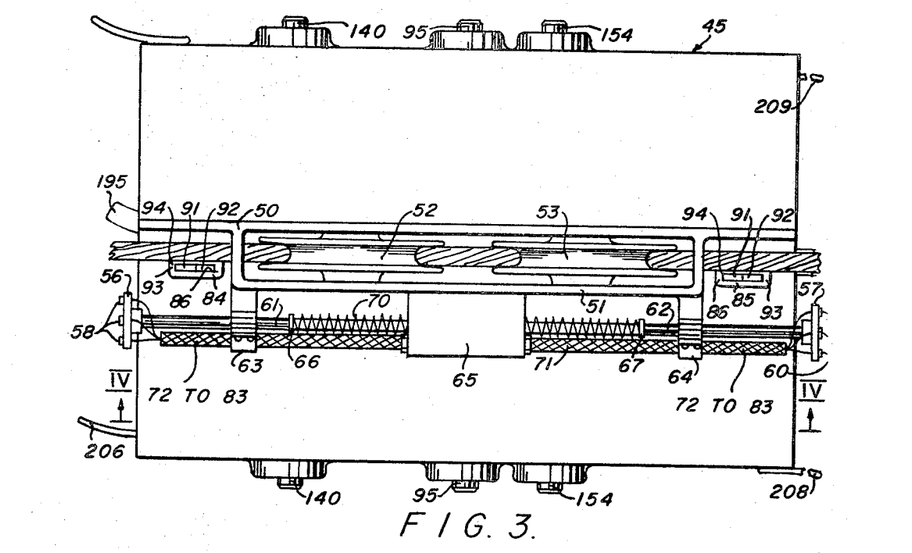
FIGURE 3 is a top view of a work carriage.
Figure 4:
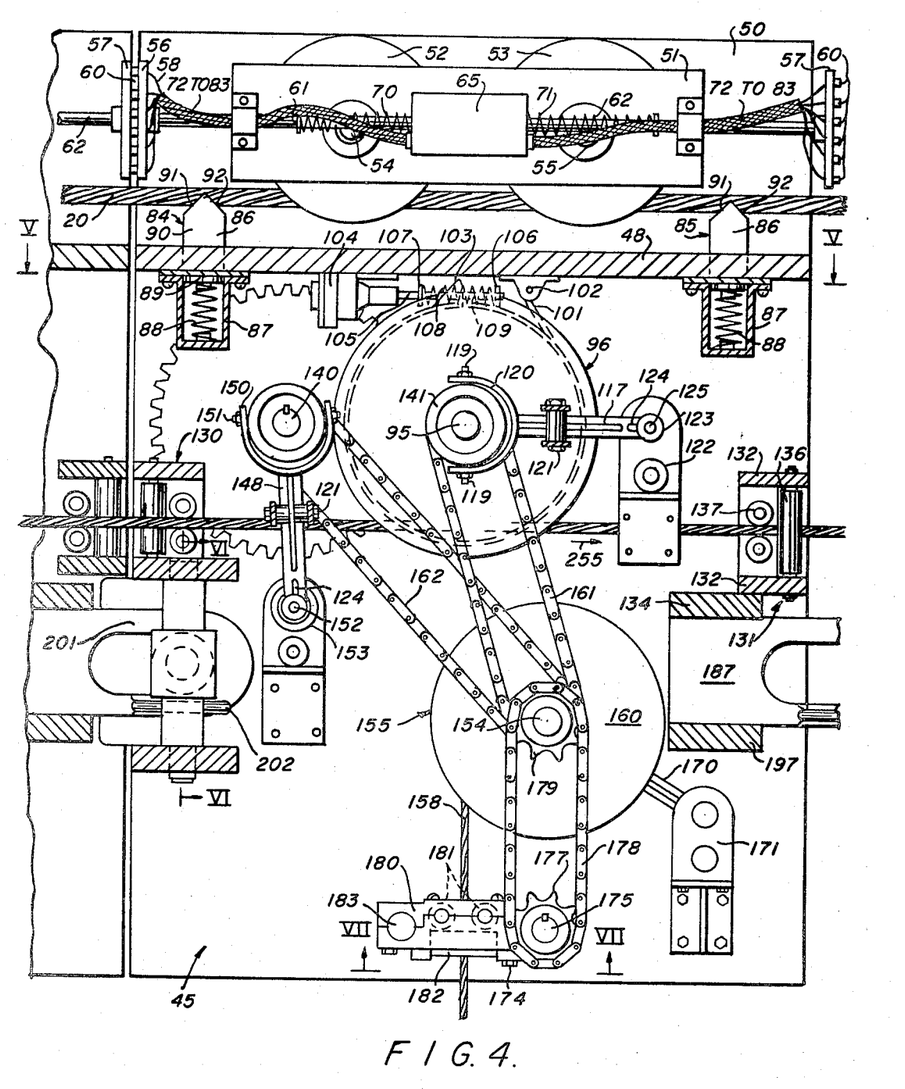
FIGURE 4 is side section view of the carriage taken along the line IV—IV of FIGURE 3 with another work carriage connected thereto.
Figure 5:
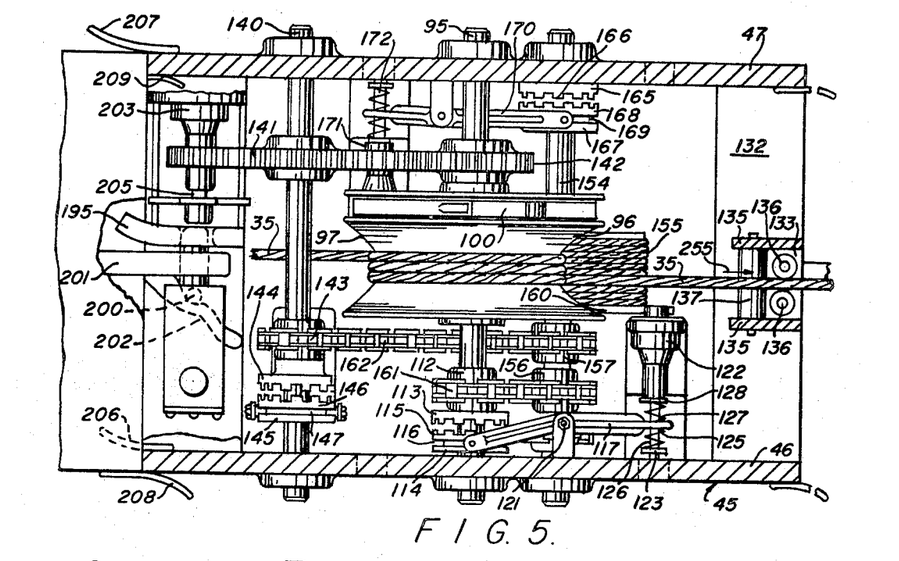
FIGURE 5 which is on the same sheet as FIGURE 3, is a top section view taken along the line V—V of FIGURE 4.
Figure 6:
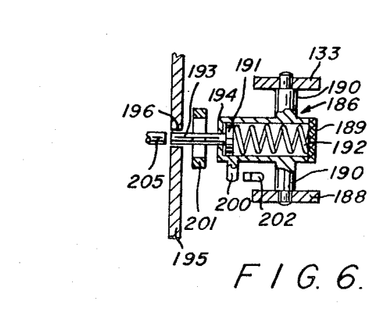
FIGURE 6, which is on the same sheet as FIGURE 1, is an end sectional view of a coupling device taken along the line VI—VI of FIGURE 4.

Two safety latches 84 and 85 are fixed to the frame before and after sheaves 52 and 53 respectively. The safety latches each include a plunger 86 reciprocably mounted in a small housing 87 secured to the frame, the housing 87 inclosing a spring 88 which engages the bottom of the housing and the plunger 86 to urge the plunger to a projecting position. The plunger 86 consists of a horizontal base plate 89 against which the spring presses and which in turn engages the top of the housing to limit the upward travel of the plunger 86 which includes a vertical plate 90 secured to a base plate 89. The plate 90 extends upwardly through a slot 93 in the top of housing 87 to a point above the bottom of cable 20. The plate 90 has slanted fore and aft sides 91 and 92 and an inner surface 94 which is only slightly spaced from cable 20. Therefore if due to a shock load, sheaves 52 and 53 jump from the cable 20, the carriage cannot fall from the cable 20 since inner surface 94 will engage the cable 20 and prevent cable 20 from escaping from under frame member 51. However, the carriage can be easily mounted on the cable 20 by manually pushing plungers 86 inwardly against springs 88 while the carriage is moved sideways to a position where sheaves 52 and 53 are over the cable 20. Moreover the presence of the safety latches does not prevent the use of tree by-passes or other intermediate skyline supporting devices, since the intermediate skyline supporting device will engage the slanted sides 91 or 92 of the plunger as the carriage travels forward or backward past the skyline supporting devices and thus cam the plungers downwardly momentarily.

Each work carriage carries two contact plates 56 and 57 which project from the fore and aft sides of the carriage respectively. The contact plate 56 on the fore side of the carriage is provided with eleven contact terminals 58. The contact plate 57 on the aft side of the carriage is provided with twelve contact terminals 60. The contact plates 56 and 57, which are aligned with each other in the longitudinal direction are held generally normal to the direction of travel of the carriage by their mounting means. The contact plate mounting means include longitudinally extending rods 61 and 62 reciprocably mounted in brackets 63 and 64 secured to the side of member 51. The contact plates 56 and 57 are connected to the outer ends of the rods 61 and 62, respectively, and the inner ends of rods 61 and 62 enter a switch box 65 also fixed to member 51. Rods 61 and 62 have collars 66 and 67 fixed thereto, and coil springs 70 and 71, which surround rods 61 and 62 respectively, engage the sides of box 65 at their inner ends and engage collars 66 and 67 at their outer ends and thereby urge contact plates 56 and 57 to a projected position.

The contact plates normally project from the fore and aft sides of the carriages a sufficient distance so that when two work carriages come together the contact plates engage and force each other back against the force of spring 70 and 71. Each one of the eleven contact terminals 58 on contact plate 56 is arranged to engage and mate with a specific one of eleven of the contact terminals 60 and contact plate 57 when the work carriages come together. The ninth contact terminal on contact plate 57 does not engage another contact terminal when two work carriages come together. The contact plates 56 and 57 may be connected to the outer ends of rods 61 and 62 by resilient means and each individual contact terminal may be mounted on its contact plate by resilient means to insure positive engagement of the mating contact terminals. Each of the electrical leads 72 to 82 are connected at opposite ends to corresponding contact terminals on contact plates 56 and 57 of the same carriage (see FIGURES 8 and 9) and pass through switch box 65 (see FIGURE 3). Electrical lead 83 is connected to the ninth contact terminal of contact plate 57 and enters switch box 65.

A transversely extending shaft 95 is journalled for rotation in side frame members 46 and 47. Fixed to the shaft 95 for rotation therewith is an endless line engaging traction drum 96. The drum has a smooth cylindrical endless line engaging surface, but preferably it is grooved or concave in crosssection as shown at 97 in FIGURE 5. The endless line 35 is wound around the drum 96 several times. The shaft 95 is preferably situated on a transverse vertical plane which includes a point midway between the supporting sheaves 52 and 53, and preferably the apex of the concave line engaging surface 97 lies on a longitudinal vertical plane which passes through the skyline engaging surfaces of the supporting sheaves 52 and 53, whereby most reactionary forces resulting from the carriage being pulled by the endless line and resulting from the endless line driving the drum 96 are transferred to the skyline cable 20 equally by sheaves 52 and 53.

The drum 96 is provided also with a narrow cylindrical surface 100 at one side of surface 97. A flexible brake band 101 is fixed to the horizontal frame member 48 at 102 as shown in FIGURE 4. The band 101 surrounds a majority of the cylindrical surface 100 and has at its opposite end an upturned rigid flange 103 which has an opening therethrough. Mounted on the lower side of frame member 48 is an electric motor 104. The motor 104 is preferably of the reversible type which drives a pinion meshing with a rack or worm gear (not shown). The rack or worm gear is formed on the inner end of actuating rod 105 so that rotation of the electric motor in a forward direction drives the rod 105 outwardly to a projected position and rotation of the electric motor in the opposition direction drives the rod 105 inwardly to a retracted position. The outer end of rod 105 passes through the opening in flange 103 on the end of band 101 and is reciprocably mounted in bushing 106 secured to the lower surface of frame member 48. At a point on the rod 105 on the inner side of flange 103, a collar 107 is fixed to the rod 105. A coil spring 108 surrounds rod 105 between collar 107 and flange 103, and a coil spring 109 surrounds rod 105 between bushing 106 and flange 103. Therefore, when the rod 105 is moved to its projected position it forces the band to tightly engage surface 100 through collar 107, spring 108 and flange 103, and thus, drum 96 is braked against rotation with respect to the frame of the carriage. When rod 105 is driven to its retracted position by electric motor 104, collar 107 is backed away from flange 103 and permits spring 109 to push flange 103 back to release the band 101 and permit free rotation of the surface 100 within the band 101.

Two endless line guides 130, 131 are located near the fore and aft sides of the carriage, respectively. Each guide includes two spaced horizontal plates 132, 132 the bottom one of which is fixed to a transversely extending frame member 133 or 134, and two vertical plates 135, 135. Vertical rollers 136, 136 which are spaced in the transverse direction are mounted for rotating between horizontal plates 132, 132. Spaced just slightly inwardly from rollers 136, 136 are vertically spaced horizontal rollers 137, 137 which are mounted to rotate between plates 135, 135. The rollers of each pair in the guides are spaced sufficiently to allow the endless line 35 to pass therebetween and the guides are so located that the endless line is directed along a line tangential to the lowest point on the periphery of drum 96 and approximately to the apex of the concave surface.

A toothed sprocket 112 is journalled on the shaft 95 at a point spaced from the drum 96. The sprocket 112 is held against lateral displacement on the shaft 95 by C-rings received in grooves in the shaft or other similar known means. Formed on the outer side surface of sprocket 112 are teeth 113. Splined to the shaft 95 adjacent teeth 113 is a clutch collar 114 having teeth 115 formed to engage with teeth 113 of the sprocket 112. The clutch collar 114 has a central peripheral groove 116. A shifting lever 117 having a bifurcated end 120 which fits over the clutch collar 114 is mounted to pivot about a vertical pin 121 secured to the side frame member 46 (see FIGURES 4 and 5). The bifurcated end 120 has opposed pins 119, 119 which are loosely received in groove 116 of the clutch collar 114. The outer end of lever 117 is provided with a slotted opening 124, through which an actuating rod 125 of an electric motor 122 passes. The electric motor 122, which is fixed to the frame, may be identical to motor 104 so that as the motor runs in a forward direction of rotation the rod 125 is extended and as it runs in the reverse direction rod 125 is retracted. The rod 125 is loosely received in opening 124 and is provided at its outer end with a fixed collar 123. A coil spring 126 surrounds the outer end of rod 121 between the collar 123 and lever 117 and a coil spring 127 surrounds the rod between lever 117 and a collar 128 fixed to the rod 125 near the motor. Thus, as the rod 125 is extended by the motor 122 the collar 128 biases the lever 117 to pivot and force clutch collar 114 to engage with the sprocket 112. As the teeth 115 on the collar 114 become meshed with the teeth 113 on the sprocket 112, the sprocket becomes fixed to shaft 95 to rotate therewith. As the rod 125 is retracted by the motor 122, the clutch collar 114 is biased out of engagement with the sprocket 112 so that the sprocket can rotate on shaft 95.

A transversely extending jack shaft 140 is journalled for rotation in side frame members 46 and 47 between shaft 95 and the fore side of the carriage. The shaft 140 has fixed thereto for rotation therewith a gear 141. Gear 141 meshes with a smaller gear 142 fixed to shaft 95 beside drum 96. A toothed sprocket 143 is journalled on the shaft 140 in a manner similar to the way sprocket 112 is journalled on shaft 95. The sprocket 143 has teeth 144 formed on its side. Splined to the shaft 140 adjacent to teeth 144 is a clutch collar 145 having teeth 146 formed to engage with teeth 144 of the sprocket 142. The clutch collar 145 has a central peripheral groove 147. A shifting lever 148 having a bifurcated end 150 which fits over the clutch collar 145 is mounted to pivot about a horizontal pin 121 secured to the side frame member 46 (see FIGURE 4). The bifurcated end 150 has opposed pins 151, 151 which are loosely received in groove 147. The outer end of lever 148 is provided with a slotted opening 124, through which passes a rod 152 of an electric motor 153. The electric motor which is fixed to the frame functions exactly the same as motor 122 to clutch sprocket 145 to the shaft 140. A winch means is provided in the carriage below drum 96, the winch means including a transversely extending shaft 154 which is journalled for rotation in side frame members 46 and 47 below shaft 95. A drum 155 on which loadline 158 is wound is fixed to shaft 154 for rotation therewith. The drum 155 is so located on shaft 154 between side frame members 46 and 47 that a vertical plane passing through the drum midway between its side flanges 160, 160 also passes through the skyline engaging grooves of sheaves 52 and 53. Moreover, the shaft 154 is located slightly to the rear of the carriage so that a vertical plane tangentially to the periphery of the front side of the drum passes through a point midway between sheaves 52 and 53.

Also fixed to shaft 154 is a toothed sprocket 156 which is aligned with sprocket 112 on shaft 95, the sprockets 156 and 112 being of the same diameter. An endless chain 161 passes around both sprockets 112 and 156 so that they are drivingly connected together. A toothed sprocket 157 is fixed to shaft 154 for rotation therewith and is aligned with sprocket 143 on jack shaft 140. The sprockets 143 and 157 are of the same diameter and are drivingly connected by an endless chain 162.

A collar 165 having teeth 166 on one side is fixed to side frame member 47 concentrically with shaft 154. Splined to the shaft 154 adjacent to the teeth 166 is a brake collar 167 having teeth 168 formed to engage with teeth 166 of the collar 165. The brake collar 167 has a central peripheral groove 169. A shifting lever 170 having a bifurcated end which fits over brake collar 167 is mounted to pivot about a pin secured to the side frame member 47. The bifurcated end has opposed pins which are loosely received in groove 169 exactly as described in the cases of the sprocket clutches, and the lever 170 is shifted by a rod 172 of an electric motor 171 which is fixed to the frame exactly as previously described to move the brake collar 167 into engagement with collar 165 whereby the teeth 166 and 168 mesh to lock the shaft 154 to the side frame member 47.

A spooler 174 is provided between the side frame members 46 and 47 below the drum 155 for guiding loadline 158 evenly onto the surface of the drum between side flanges 160, 160 of the drum. The spooler 174 includes a transversely extending shaft 175 which extends between side frame members 46 and 47 and is journalled therein for rotation. The shaft 175 has a reversible thread below drum 155 (see FIGURE 7) and a toothed sprocket 177 fixed to it adjacent one end. A chain 178 drivingly connects sprocket 177 and a sprocket 179 which rotates with shaft 154. Therefore as shaft 154 is driven by the endless line drum 96, shaft 175 is driven in the same direction. The spooler 174 further includes a transversely extending shaft 183 which is fixed between side frame members 46 and 47 on the same horizontal plane as shaft 175 but is spaced from shaft 175. A framework 180 is supported on shafts 175 and 183. The framework 180 is mounted to reciprocate on shaft 183 and a boss 184 carried by the framework 180 receives shaft 175. The boss 184 contains a thread tracer of a known type which engages the reversing thread 176 so that rotation of the shaft 175 drives the framework 180 back and forth in a transverse directed under the front side of the loadline engaging surface of drum 155. Mounted for rotation in framework 180 are a first pair of spaced parallel rollers 181, 181 and a second pair of spaced rollers 182 below the first pair and normal thereto. The rollers of each pair are sufficiently spaced to permit loadline 158 to pass therebetween. The first pair of rollers 181 are so located with respect to the sheaves 52 and 53 that the midpoints between the first pair of rollers 181 and between the sheaves 52 and 53 are on a common vertical plane. Thus with the above described location of drum 155 and the location of spooler 174 the loads raised by loadline 158 are carried substantially equally by both sheaves so that tipping and swaying of the carriage is minimized.

A first coupling means 186 is carried by the frame adjacent the fore side of the carriage, i.e. adjacent the side of the carriage facing the work area, and a second coupling means 187 is carried by the frame adjacent the aft side of the carriage, i.e. the side of the carriage facing the home spar tree 21. The coupling means 186 is located between transverse frame member 133 and a lower transverse frame member 188, and coupling means 187 is located between transverse frame member 134 and a lower transverse frame member 197. Only a portion of coupling means 187 of the carriage is shown at the right of FIGURE 4, but the coupling means 187 of an adjacent carriage at the left of FIGURE 4 is shown in locking engagement with coupling means 186.

The coupling means 186 includes a cylinder 189 mounted to pivot about a vertical axis by vertical trunnions 190, 190 journalled in transverse frame members 133 and 188. A piston 191 is mounted for reciprocation in cylinder 189 and is biased to the outer end of the cylinder by coil spring 192. The piston 191 has a piston rod 193 fixed to it and the rod 193 extends through an opening 194 in the outer end of the cylinder. A vertical plate 195 is spaced transversely from the cylinder 189. The plate 195 has an opening 196 which is slightly large in diameter than the rod 193. The plate 195 and its opening 196 are so positioned with respect to the cylinder 189 that as the cylinder pivots towards a position in which its longitudinal axis extends transversely with respect to the direction of travel of the carriage, the outer end of the rod 193 engages plate 195 and forces piston 191 against the biasing force of spring 192. When the cylinder 189 reaches the transverse position the outer end is forced into the opening 196 by spring 192 to lock the cylinder 189 in the transverse position. An electric motor 203 is fixed to the frame on the opposite side of the plate 195 as the cylinder 189 (see FIGURE 5). The motor 203 is similar to the electric motors previously described, the motor 203 having a push rod 205 which is driven to an extended position when operated in a forward direction and to a retracted position when it is operated in reverse. The push rod 205 is aligned with opening 196 and is slightly smaller in diameter than the opening. When the push rod 205 is in its extended position its outer end projects through opening 196 and is flush with the opposite face of the plate. Thus when motor 203 is operated in a forward direction and the cylinder 189 is in its locked transverse position, the push rod 205 engages the end of piston rod 193 and moves the piston rod 193 out of the opening 196 against the force of spring 192 to unlock the cylinder 189 from its locked transverse position.

The coupling means 187 comprises a loop 201 which projects from the aft side of the carriage. The loop 201 is held between transverse frame member 134 and transverse frame member 197 and is so located that as two carriages come together the loop 201 of one carriage will project between cylinder 189 and vertical plate 195 of the next carriage. The cylinder 189 has a downwardly projecting finger member 200 fixed to it near its outer end and the loop 201 has a finger member 202 projecting outwardly and rearwardly from the side of the loop which is adjacent the cylinder 189 when the loop projects between the cylinder 189 and plate 195 of the next carriage (see FIGURES 4 and 5). When two carriages come together, the cylinder 189 is at an angle to its locked transverse position, i.e. its outer end is turned towards the approaching carriage. As the two carriages meet, the finger member 202 engages finger member 200 and pivots the cylinder to its locked transverse position. However, since the finger member 202 is not located at the outer end of loop 201, the piston rod 193 enters the loop 201 as the cylinder pivots, and as a result the loop encircles piston rod 193 when the outer end of the piston rod 193 enters opening 196 to lock the carriages together. To unlock the coupling means, motor 203 is operated in a forward direction to drive piston rod 193 from opening 196. Thus, as the two carriages are pulled apart, loop 201 engages piston rod 193 and thereby swings the cylinder to the position which it occupied before the carriages came together. As this happens the piston rod 193 leaves the loop 201 and the carriages are free to separate.

Each carriage has curved guide plates 206 and 207 fixed to side frame members 46 and 47, respectively, and projecting from the fore side of the carriage and curved guide plates 208 and 209 fixed to side frame members 46 and 47 respectively, and projecting from the aft side of the carriage. Plate 206 is fixed to the inside of side frame member 46 and is curved inwardly, and plate 207 is fixed to the outside of side frame member 47 and is curved outwardly. Plate 208 is fixed to the outside of side frame member 46 and is curved outwardly, and plate 209 is fixed to the inside of side frame member 47 and is curved inwardly. When two carriages come together these curved guide plates insure that the side frame members of the two carriages align exactly so that the coupling means will properly interlock and the correct contact terminals on the mating contact plates engage.

The construction of the cutting area guide carriage may be identical to the work carriage with the exception of its electrical wiring which will be described later.

The central work area guide carriage 27 may be of relatively simple construction. It also has two skyline cable engaging sheaves (not shown) for supporting it on the skyline 20. It has a transverse opening 212 through its centre (see FIGURE 2) with a bearing device similar to guides 130 and 131 mounted therein. A cable 213, which is secured to a tree 214 in front of the carriage 27, extends back to the carriage 27, through the bearing device in opening 212, forward to a block 215 on a tree 216, and then back to a winch (not shown) which may be driven by the donkey engine. Thus, by taking in or lettting out cable 213 on the winch, the position of carriage 27 can be varied along the skyline between the spar tree 21 and a straight line joining trees 214 and 216. The carriage 27 is also provided with a coupling means 186 identical to that provided on the work carriages for coupling the carriage 27 to the coupling means 187 of a work carriage.

The carriage 27 is provided with a contact plate 211 (see FIGURE 9) for engagement with the contact plate 57 on the aft side of a work carriage. The contact plate 211 of the carriage 27 has twelve contact terminals, one for engagement with each of the twelve contact terminals of the plate 57.

Figure 8:
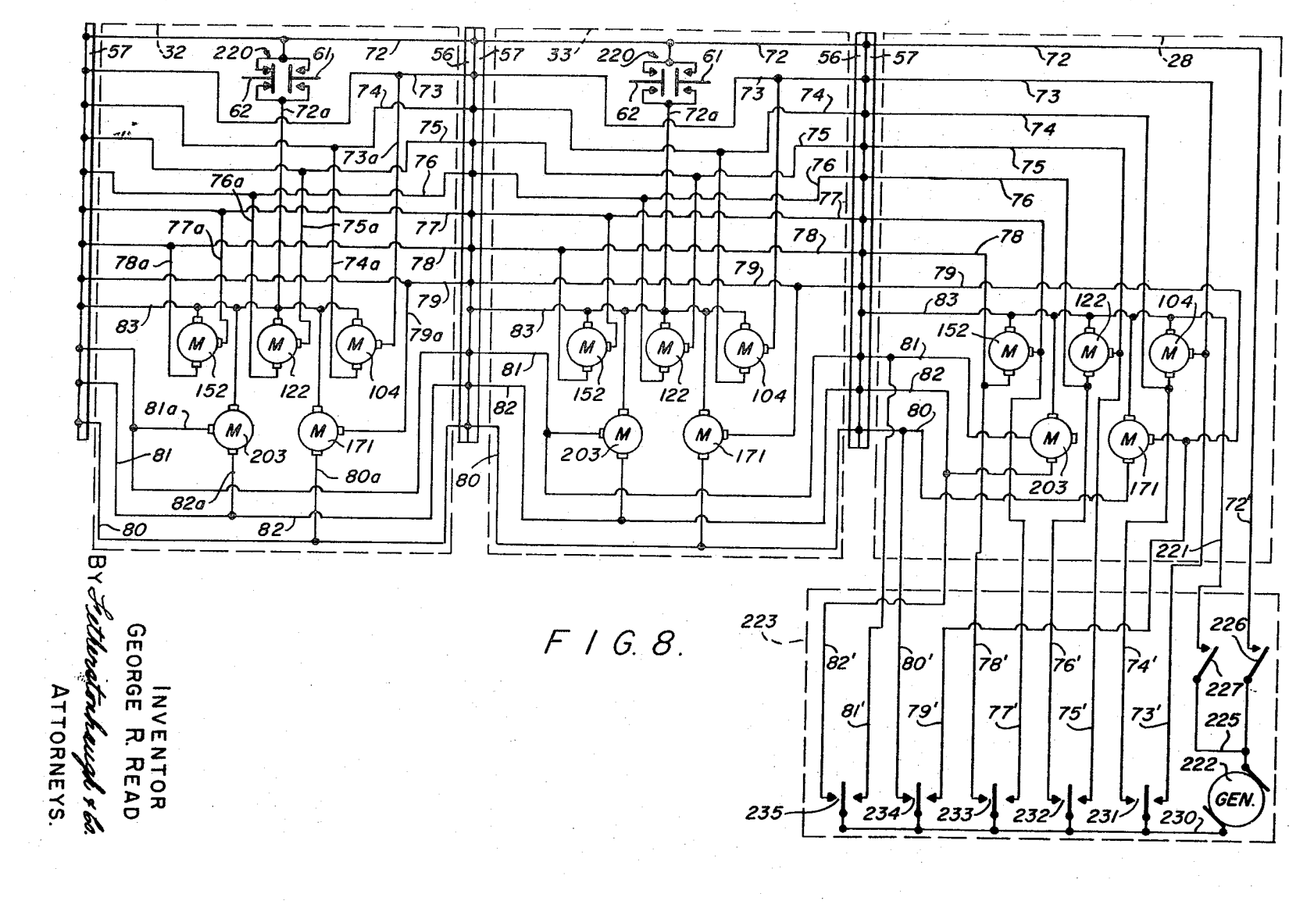
FIGURE 8 is a schematic of the electrical control system of two work carriages at the cutting area.
Figure 9:
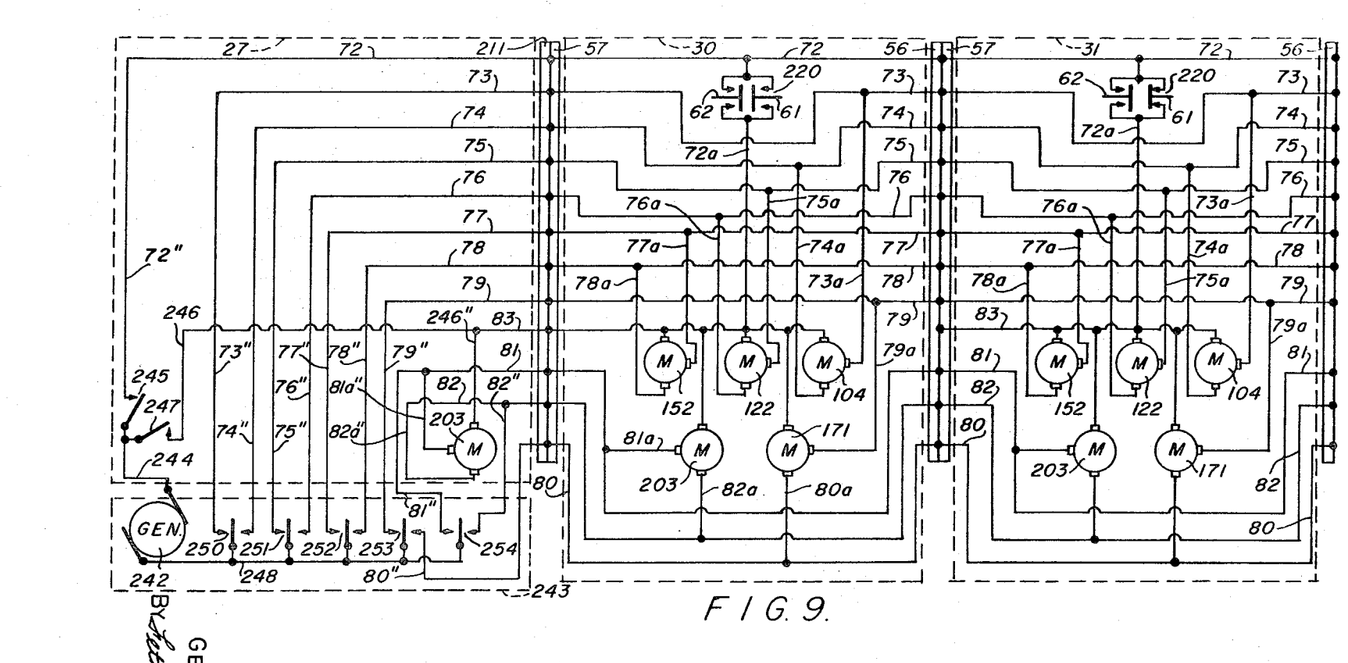
FIGURE 9 is a schematic of the electrical control system of two work carriages at the central work area.

The wiring systems in the work carriages are identical. Each carriage has an electrical main supply lead 72, which is connected at one end to one contact terminal on plate 56 and at its other end to a corresponding contact terminal on plate 57. The contact terminals on plates 56 and 57 to which lead 72 is connected being so arranged that when two carriages come together, these two contact terminals on engaging carriages mate as shown in FIGURES 8 and 9, i.e. the arrangement of contact terminals on plate 56 is a mirror image of the arrangement of contact terminals on plate 56. Connected to the main supply lead 72 is a main control switch 220 which is housed in switchbox 65. The switch 220 is connected to the inner ends of push rods 61 and 62. The switch 220 includes two pairs of contact terminals in parallel, one pair being closed by rod 61 if contact plate 56 is urged to its projected position by spring 70 and the other pair being closed by rod 62 if contact plate 57 is urged to its projected position by spring 71. Thus a lead 72a which is connected to switch 220 and to each of motors 104, 122, 152, 171 and 203 is connected to main supply lead 72 when one or neither of contact plates 56 and 57 is in engagement with a contact plate of another carriage. In FIGURES 8 and 9, for example the leads 72a of carriages 31 and 32 are connected to leads 72 via switch 220 since contact plates 56 and 57, respectively, of these carriages are not in engagement with another plate, whereas the leads 72a of carriages 30 and 33 are disconnected from leads 72 by switch 220 since both contact plates of these carriages are in engagement with contact plates of other carriages.

As indicated above, the lead 72a is connected to each of motors 104, 122, 152, 171 and 203. These motors in the embodiment shown are of the type having a double field winding, both of which windings are connected at one of their ends to a common main supply terminal and which windings are connected at their other end to two separate return lead terminals. The two windings are opposite in direction so that when the current flows through one of the windings to its respective return lead terminal, the rotor of the motor is rotated in one direction, and when the current flows through the other of the windings to its other respective return lead terminal, the rotor of the motor is rotated in the other direction. Thus, each carriage is provided with two return leats which are connected at opposite ends to corresponding contact terminals on plates 56 and 57, for each motor (see leads 74 to 82 in FIGURES 8 and 9). Leads 73 and 74, which are provided for motor 104, are connected by leads 73a and 74a to the forward and reverse terminals, respectively, of motor 104. Leads 75 and 76 are connected by leads 75a and 76a to the forward and reverse terminals, respectively, of motor 122. Leads 77 and 78 are connected by leads 77a and 78a to the forward and reverse terminals, respectively, of motor 152. Leads 79 and 80 are connected by leads 79a and 80a or to the forward and reverse terminals, respectively, of motor 171. Leads 81 and 82 are connected by leads 81a and 82a to the forward and reverse terminals, respectively, of motor 203.

As described above, electrical lead 83 is connnected at one end of the ninth contact terminal on contact plate 57 It is connected at its other end to lead 72a.

Also as indicated above, the mechanical construction of the guide carriage 28 may be identical to the construction of the work carriages, 30, 31, 32 and 33, i.e. a standard work carriage can be used as the guide carriage, it being only necessary to alter its wiring system slightly. The main control switch 220 is rendered inoperative in an open position, this switch not being shown as existing in guide carriage 28 of FIGURE 8, and a control supply lead 221 which will be described below is connected directly to lead 72a of the guide carriage 28 (see FIGURE 8).

A small portable generator unit 222 is located on the ground at the cutting area (see FIGURES 1 and 8). The supply of electrical energy from the generator unit 222 to the motors in the carriages above the cutting area is controlled by a control panel 223 which can be carried around by a logger in control of the operation at the cutting area, the leads connecting the control panel and the generator unit being enclosed in a hollow flexible casing 224. The output terminal of the generator is connected to above mentioned control supply lead 221 for the guide carriage and to a main electrical supply lead 72′ by a lead 225. Main electrical supply lead 72′ is connected to main supply lead 72 of the guide carriage 28 and is provided with a switch 226 in control panel 223 which switch is closed whenever the working carriages are being operated. Lead 221 is provided with a switch 227 in the control panel. The switch 227 is normally left open, but is closed whenever it is desirable to operate the motors of guide carriage 28. A lead 230 is connected to the return terminal of the generator unit 222. Return leads 73′ and 74′, which are connected to leads 73 and 74 of guide carriage, can selectively be connected to lead 230 through a switch 231 in the control panel. As shown in FIGURE 8, the switch 231 is designed to connect only lead 73′ or 74′ to lead 230 at one time, not both. Similarly, leads 75′ and 76′, 77′ and 78′, 79′ and 80′, and 81′ and 82′, which are connected to leads 75 and 76, 77 and 78, 79 and 80, and 81 and 82, respectively, of the guide carriage 28, can be selectively connected to lead 230 by switches 232, 233, 234 and 235, respectively, in the control panel.

As indicated previously, an electrical line supporting carriage 37 is supported on skyline 30 above the guide carriage 28. The carriage 37 preferably includes two supporting sheaves (not shown), which ride on the skyline cable 20, and a cable 240 which is simply fixed to the carriage 37 is anchored to a stump. The carriage 37 also includes a set of guide rollers (not shown) through which the endless line 35 passes. The leads 72′, 73′, 74′, 75′, 76′, 77′, 78′, 79′, 80′, 81′, 82′ and 221 pass through a flexible hollow casing 241 which is fixed at opposite ends to generator unit 222 and guide carriage 28 and is supported by carriage 37. The cable 240 is always kept adjusted by the loggers at the cutting area so that the section of hollow casing 241 between carriages 28 and 37 is kept taut. Thus, since the endless line 35 passes through carriage 37 the hollow casing 241 enclosing the electrical leads is prevented from engaging the moving endless line 35.

At the home tree there is provided a generator unit 242 (see FIGURE 9), which is preferably driven by the donkey engine. The supply of electrical energy from the generator unit 242 to the motors in the work carriages above the central work at the home tree is controlled by a control panel which may be located in shanty 34. The output terminal of the generator 242 has connected thereto a lead 244. A main electrical supply lead 72″ is connected at one end to a contact terminal on contact plate 211 and is normally connected to lead 244 by a switch 245 on control panel 243. The contact terminal to which lead 72″ is connected is located to engage, on a contact plate 57 of a work carriage, the contact terminal to which lead 72 of the work carriage is connected. A lead 246 is connected to the above mentioned ninth contact terminal on the contact plate and is adapted to be connected to lead 244 by way of switch 247 in control panel 243. Contact plate 211 is provided with contact terminals arranged to engage the contact terminals to which leads 73, 74, 75, 76, 77, 78, 78, 79, 80, 81, 82 are connected of the contact plate 57 of a work carriage, and to these contact terminals of contact plate 211, leads 72″, 73″ 74″, 75″, 76″, 78″, 79″, 80″, 81″ and 82″, respectively are connected. A lead 248 is connected to the return terminal of the generator unit 242. Switches 250, 251, 252, 253, 254 are provided in control panel 243 and are adapted to connect either 73″ or 74″, 75″ or 76″, 77″ or 78″, 79″ or 80″, and 81″ or 82″, respectively to lead 248.

The lead 246 is connected via lead 246″ to the common main supply terminal of motor 203 of the coupling means of guide carriage 27, and return leads 81″ and 82″ are connected to the forward and reverse terminals, respectively via leads 81a″ and 82a″ of motor 203 at the guide carriage 27.

In operation of the overall system, suppose there are two work carriages 32 and 33 at the cutting area as shown in FIGURES 1 and 8, a load just having been secured to the loadline 158 of carriage 32. Also suppose at the same instant there are two work carriages 30 and 31 at the central work area at the home tree, as shown in FIGURES 2 and 9, carriage 31 just having arrived with a load. During this phase of the operation the endless line 35 is circulated by the donkey engine in the direction of the arrows 255, and the brake means which controls the rotation of drum 96 in each of carriages 28, 30, 31, 32 and 33 is disengaged to permit free rotation of the drum 96 in each of these carriages.

Once the load has been secured to the loadline of carriage 32, the operator of the control panel 223 who can easily view the securing operation, operates switch 233 to connect lead 77′ to lead 230. At this instant switch 226 is already closed and switch 227 is already opened. Therefore, since the contact plate 57 of carriage 32 is in its projected position the main control switch 220 is closed by rod 62 to connect lead 72a to lead 72 in carriage 32. The switch 220 of carriage 33 is open, however, since both contact plates 56 and 57 are in engagement with contact plates of the guide carriage 28 and work carriage 32, and therefore no electrical energy can reach the motors in carriage 33. As switch 233 connects lead 77′ to lead 230, a circuit, which includes leads 225, 72′, lead 72 of guide carriage 28, leads 72, 72 of work carriages 33 and 32, lead 72a of work carriage 32, the forward winding of motor 152 of work carriage 32, the forward return lead 77a of work carriage 32, lead 77 of carriage 32, lead 77 of carriage 33, the lead 77 of guide carriage 28, lead 77′ and lead 230, is closed. Therefore, motor 152 of carriage 32 is driven in the forward direction to clutch sprocket 143 to the jack shaft 140.

The motor 152 and the other four motors in the carriages, namely motors 104, 122, 171 and 203, are preferably each provided with two limit switches so that the motor is automatically stopped as the actuating rod reaches its fully extended or fully retracted position. With this arrangement it is not necessary for the operator at the control panel to bother with the switch of the motor at the control panel after he has put it in a forward or reverse closed position until he is ready to run the motor in the opposite direction.

The drum 155 is thus rotated by the endles line 35 through drum 96, gears 142 and 141, jack shaft 140, sprocket 143, chain 162, sprocket 157, and shaft 154 at a speed slower than the rotation of the drum 96 to reel in loadline 158. The loadline is spooled evenly onto the drum 155 by spooler 174. As the load approaches the desired height, the operator operates switches 234, 231 and 235, in that order, to connect leads 79′, 73′ and 81′ to lead 230, and thereby complete the three circuits which include the forward windings of motors 171, 104 and 203. Thus, shaft 154 of carriage 32 is locked to the frame of the carriage by brake collar 167 as motor 171 is driven in the forward direction. Brake band 101 is applied to lock drum 96 against rotation as motor 104 is driven in the forward direction. Also carriage 32 is uncoupled from carriage 33 as push rod 205 is driven into opening 196 in plate 195. The carriage is then pulled along skyline cable 20 by the endless line 35, which is wrapped around drum 96, towards the home tree.

Even in the event the brake band 101 fails during the work carriage's journey to the home tree, it is prevented from running away with its load by brake collar 167 since sprocket 143 is left clutched to jack shaft 140, i.e. the drum 96 is left drivingly connected to shaft 154 which is in turn braked to the frame. Moreover, even if brake collar 167 should fail at the same time as brake band 101 fails, the carriage would only run free until the loadline 158 was reeled in completely. If the loadline was reeled in completely the load would jam into the bottom of the carriage to prevent further rotation of drum 155, and since drum 155 would still be drivingly connected to drum 96, the load jamming against the carriage would brake drum 96.

As soon as carriage 32 starts to leave carriage 33, the operator flips switches 231, 233, 234 and 235 to a completely open position. Switch 232 is then operated to connect lead 75' to lead 230. Thus the forward winding of motor 122 is energized in carriage 33 since the main control switch 220 of this carriage is closed by rod 62 as soon as carriage 32 departs. As motor 122 is driven forward the clutch collar 114 is moved into engagement with sprocket 112 by motor 122 through lever 117 and clutches sprocket 112 to shaft 95. Thus, as drum 96 is rotated by the endless line, drum 155 is driven through sprocket 112, chain 161, and sprocket 156 to let out the loadline 158. When an appropriate amount of loadline has been let out the switch 232 is operated to connect lead 76, to lead 230. The reverse winding of motor 122 is thereby energized to disengage the clutch collar from the sprocket 112.

If it is found that the carriage is not well situated for its load, its location on the skyline cable 20 can be varied by opening switch 226 and closing switch 227. The work carriage 33 is thereby deenergized and guide carriage 28 energized so that motor 171 of the guide carriage 28 can be operated to unbrake shaft 154 and the clutch means including motors 122 and 152 which controls the drive between loadline drum 155 and drum 96 can be actuated to let out or reel in the loadline 158 of guide carriage 28. The loadline 158 of the guide carriage 28 is anchored to a stump uphill from the carriage so that as the loadline 158 is let out or reeled in the guide carriage and the work carriage 28 coupled thereto is moved backward or forward along the skyline 20. Once the carriage has been properly located the switch 234 is operated to connect lead 79' to lead 230 and the shaft 154 of the guide carriage 28 is again locked to the frame by its motor 171. At this stage switch 227 is opened and switch 226 closed to complete the loading of carriage 32. Once the loadline is secured to the load, the loadline is reeled in and the carriage permitted to start its journey towards the home tree as described in connection with carriage 32.

During the time carriage 32 is being loaded and during its journey to the home tree, carriage 31 is being unloaded at the home tree (see FIGURES 2 and 9). The load secured to loadline 158 of carriage 31 is lowered to the ground by operating switch 251 to connect lead 75" to lead 248 so that the forward winding of motor 122 is energized, the switches 245 and 247 being closed and opened, respectively at this stage. As the load approaches the ground, switch 251 is operated by the operator in shanty 34 to connect lead 76" to lead 248. This energizes the reverse winding of motor 122 in carriage 31 so that sprocket 112 is unclutched from shaft 95 and the drum 155 is no longer driven by the endless line 35 through endless line drum 96, sprocket 112, chain 161 and sprocket 156. Thus the loadine 158 can be disconnected from the load, and then switch 252 is operated by the operator to connect lead 77" to lead 248 to energize the forward winding of motor 152. The clutch collar 145 is thereby moved to engage and clutch sprocket 143 to the jack shaft 140. The loadline 158 of carriage 31 is then reeled in. When the loadline is completely reeled in, switch 252 is moved by the operator to connect lead 78" to lead 248 and the sprocket 143 is thereby unclutched from shaft 140 by motor 152.

When carriage 31 arrives at the home tree it couples up with carriage 30, thereby de-energizing the motors of carriage 30 sinch push rod 61 of carriage 31 is actuated to open switch 220. If carriage 30 has not been unloaded at this time the operator can flip switch 247 to connect lead 244 through lead 246 to lead 83 to energize the motors of carriage 30 through the ninth terminal whereby the brake motor 104 of carriage 30 is activated by way of said ninth terminal when both of the contact plates of the switch are in their second, open position.

All the time the above operations are being carried out switches 250 and 254 are in a position to connect leads 74" and 82" to lead 248. However, as described previously, the motors are provided with limit switches so that during this time the reverse windings of motors 104 and 203 are not actually energized but the actuating rods of these two motors remains in their retracted position. As loaded carriage 32 approaches unloaded carriage 31, contact plate 57 of carriage 32 engages contact plate 56 of carriage 31 and the main supply lead 72 of carriage 32 immediately becomes energized. As this happens the reverse winding of motor 104 becomes energized to retract rod 105 and unbrake endless line drum 96. The reverse winding of motor 152 is energized at the same time since switch 252 has remained in a position to connect lead 78" to lead 248. Thus sprocket 143 is unclutched from jack shaft 140 in carriage 32, and the endless line engaging drum 96 thus proceeds to rotate in carriage 32.

Since switch 254 is also in a position to connect lead 82" to lead 248 the push rod 205 at the coupling means 186 in carriage 32 is retracted by motor 203, the reverse winding of which is energized upon engagement of contact plate 57 of carriage 32 with contact plate 56 of carriage 31. Therefore, coupling means 186 of carriage 32 is made ready to couple with coupling means 187 of carriage 33 when it arrives.

As carriage 32 comes into close contact with carriage 31, the coupling means 186 of carriage 31, which was made ready when carriage 31 arrived at the home tree in a manner exactly as described above, locks with coupling means 187 projecting from the aft side of carriage 32. As the carriages come into engagement, contact plate 56 of carriage 31 is pushed in and switch 220 is thereby completely opened by rod 61.

As soon as carriage 32 becomes coupled to carriage 31, the operator in shanty 34 can move switch 253 to connect lead 80" to lead 248. This energizes the reverse winding of motor 171 to unbrake shaft 154. At substantially the same instant switch 251 is operated to connect lead 75" to lead 248 whereby the load can be lowered as described in connection with carriage 31.

During the unloading of the work carriages the guide carriage 27 can be moved to properly locate the carriage by taking in or letting out line 213 as described previously.

When the last carriage, namely carriage 33 in the example shown in FIGURES 1 and 2, has been unloaded at the home tree central work area, switches 245 and 247 are opened are closed, respectively, by the operator in the shanty 34. Also at this time the direction of circulation of the endless line is reversed to the direction shown by arrows 256. As this operation takes place the push rod 205 is extended by motor 203 in guide carriage 27 to uncouple work carriage 30 from the guide carriage because of the position of switch 254. At the same time, the operator moves switch 250 to connect lead 73" to lead 248. Thus the forward winding of motor 104 in carriage 30 becomes energized since although switch 220 of this carriage is open, the common main supply terminal of motor 104 is connected to the output terminal of generator unit 242 via leads 244, 146 and 83. Thus the endless line drum 96 of carriage 30 is braked against rotation. The carriage 30 is then pulled by endless line 35 towards the cutting work area, and carriage 30 in turn pushes the train of carriages 31, 32 and 33.

After the work carriages leave guide carriage 27, switch 254 is operated to connect lead 82″ to lead 248, and this brings about the retraction of push rod 205 in the guide carriage 27 and readies the coupling means 186 of the guide carriage for the return of loaded carriage 30. When the push rod 205 is retracted switches 245 and 247 are closed and opened respectively and switch 250 is operated to connect lead 74″ to lead 248. The home tree is then entirely ready for the arrival of loaded carriage 30.

As the train of work carriages approach guide carriage 28, switch 231 is moved to connect lead 74′ to lead 230 and switches 232 to 235 are preferably all placed in neutral position. Thus, as soon as contact plate 56 of carriage 33 contacts contact plate 57 of the guide carriage 28, the reverse winding of motor 104 in carriage 30 is energized to start the reelase of the brake band 101. The coupling means 186 of carriage 33 which was made ready at the time carriage 33 arrived at the home tree, couples with coupling means 187 of guide carriage 28, and as the band 101 of carriage 30 becomes completely released the whole train comes to rest coupled to the guide carriage 28. The endless line 35 is then reversed to circulate in the direction of arrows 255 and the operator at the cutting area proceds to let down the loadline of carriage 30 as previously described in connection with carriages 32 and 33.

Although four work carriages are shown in FIGURES 1 and 2, it can be readily seen that any number could be utilized without any alteration to the system. For example, if the skyline cable 20 is exceptionally long, several carriages may be on their journey from the cutting area to the home tree while carriage 32 is being loaded and carriage 31 is being unloaded.

Figures 7, 10:
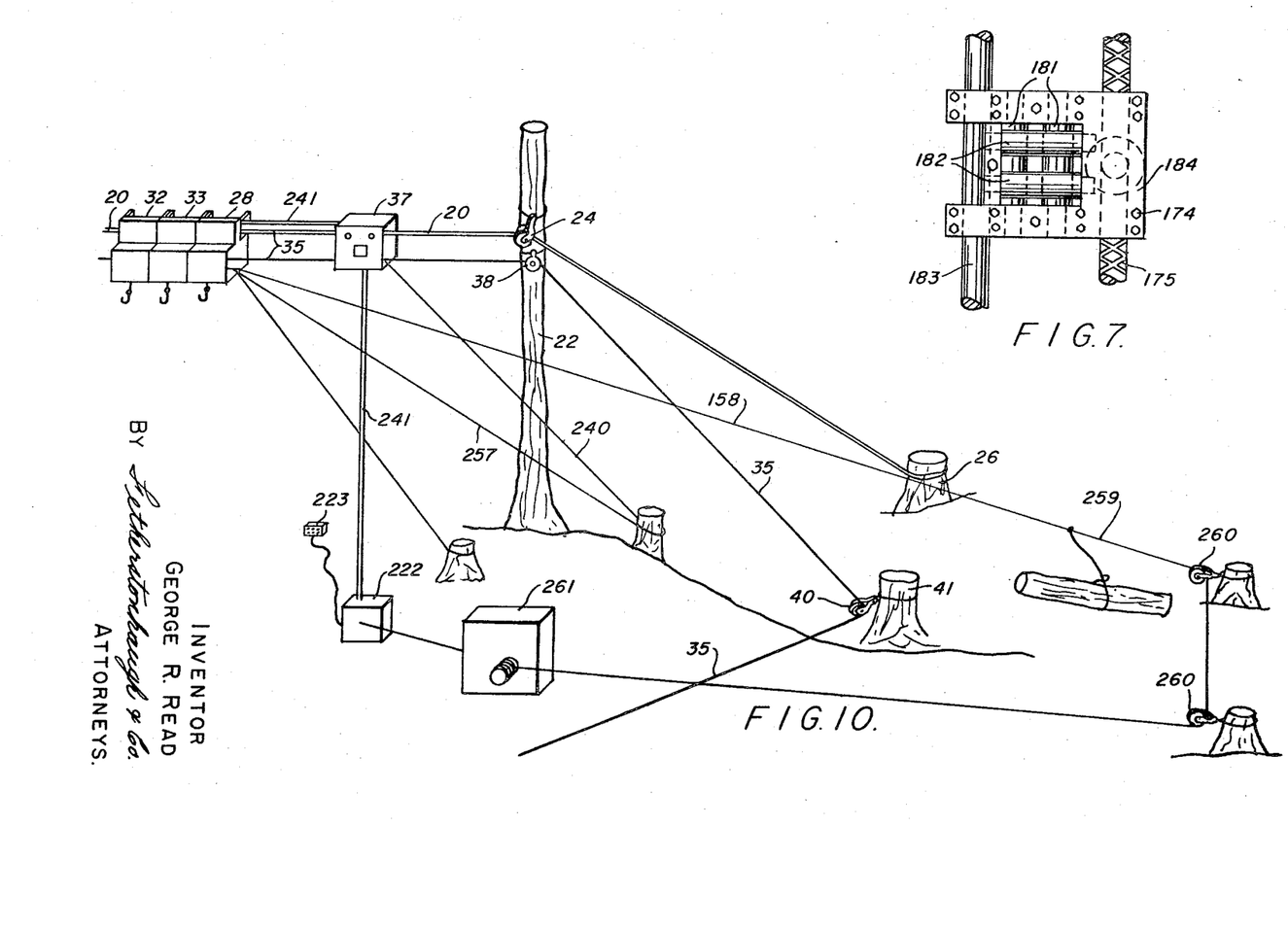
FIGURE 7 is a bottom view of a spooler device as seen from line VII—VII of FIGURE 4.
FIGURE 10 which is on the same sheet as FIGURE 7, is a pictorial view of an alternative arrangement for the work area at the outer spar tree.

In FIGURE 10 the arrangement at the outer end of the skyline is shown altered to permit cutting in two areas at the same time. In the altered arrangement, the guide carriage is anchored to stumps by cables 257 fixed to the frame of the carriage and to the stumps. To the outer end of the loadline 158 of the guide carriage is secured a light line 259. The light line 259 passes through blocks 260, 260 anchored to stumps at a considerable distance from the guide carriage 28. The light line 259 extends back and is wound around a drum of a small winch 261 at the portable generator unit 222. The winch 261 can be small since its only function is to pull the loadline 158 of the guide carriage 28 out to a second cutting area via light line 259. The winch 261 can be operated by an electric motor connected to generator unit 222 or by a separate engine.

With the arrangement shown in FIGURE 10, the shaft 154 can remain unbraked. The loadline 158 of the guide carriage can then be pulled out to a second cutting area by winch 261. When a load is attached to the loadline 158 of the guide carriage at the second cutting area, and the operator at the first cutting area has a chance to close switch 227 and open switch 226, he can energize the forward winding of motor 152 in the guide carriage, and thereby, cause drum 155 to be driven by the rotating endless line engaging drum 96 so that the loadline 158 of the guide carriage pulls the load from the second to the first cutting area. This load can then be secured to the loadline 158 of a work carriage and taken to the central working area at the home tree. With this arrangement the area covered by a single skyline system can be greatly increased ad since two cutting crews can operate simultaneously, the efficiency of the system is improved.

As an alternative to the system shown in FIGURE 10, a first guide carriage 28 can be located at a point between the home spar tree and the outer spar tree and a second guide carriage 28 can be located nearer the outer spar tree. With this alternative, a guide carriage similar to carriage 27 is located just outwardly from the first guide carriage 28, and a second train of work carriages are operated between the second pair of guide carriages, i.e. two complete sets of carriages are carried on one skyline cable and operated by one endless line. With this set up, the logs cut under the second guide carriage 28 are transported by the second train of work carriages to the area of the first guide carriage 28. At the first guide carriage 28 these logs are transferred to a carriage in the first train of work carriages, and thence carried to the home tree area. This set up also permits two separate cutting crews to work simultaneously.

In place of the electric motors described in the work carriages solenoids could be used to move the actuating rods between their extended and retracted positions. As a still further alternative the motors could be pneumatic with solenoid control valves, the pressurized air being provided by a compressor driven by sheave 52 or 53 or by drum 96.

From the above, it can be seen that the present invention makes possible a system which is efficient and safe. In the described system, the operator at the cutting area has complete control of the work carriage as it is being loaded. The clutch means includes motors 122 and 152 permits the operator at the cutting area to drivingly connect or disconnect the loadline drum 155 to the rotating endless line engaging drum 96 at his will, so that the loadline is under control at all times and the departure of the work carriage from the cutting area is also entirely within the control of this operator. Therefore, he can see that the men are completely free of the logs before the logs are moved, and in the event of an emergency, he is in a position to take immediate action to rectify the matter.

What I claim as my invention is:

1. A transportaing carriage of the overhead track-supported type, said carriage comprising a frame, sheaves mounted on said frame and arranged to support the carriage from the overhead track, an endless line engaging traction drum journalled in said frame, a loadline winch means mounted in said frame, drive means connecting said drum to said winch means, brake means associated with said drum for fixing said drum against rotation with respect to said frame, an electric motor means for actuating said brake means, a contact plate means mounted on said frame and including at least one contact terminal, said contact plate means being arranged to engage and mate with other similar contact plate means held stationary with respect to said track or carried by another carriage, and an electrical lead connected to said contact terminal and arranged to supply electrical energy to said electric motor means from said contact terminal.

2. A transporting carriage of the overhead track-supported type, said carriage comprising a frame, overhead track engaging sheaves mounted on said frame and arranged to support the carriage, an endless line engaging drum journalled for rotation in said frame on an axis normal to the direction of travel of the carriage, brake means adapted to fix said drum against rotation with respect to said frame, a loadline winch mounted in said frame, a clutch means arranged to drivingly connect said winch to said drum, an electric motor means for actuating said brake means, an electric motor means for actuating said clutch means, a front contact plate and a rear contact plate carried by said frame, said contact plates having brake and clutch motor means contact terminals and being arranged to engage and mate with similar contact plates carried by other carriages or fixed with respect to the track so that corresponding terminals of engaging plates make contact, and electrical leads connected at opposite ends to corresponding terminals of the two plates of the carriage, said leads being arranged to supply electrical energy to said brake and clutch motor means.

3. A carriage as defined in claim 2, wherein said front and rear contact plates are mounted on the frame in positions normal to the direction of travel of the carriage and project from fore and aft sides of the carriage, respectively.

4. A carriage as defined in claim 3, further comprising contact plate mounting means adapted to bias said contact plates to a first normal position, said plates being movable against the bias to a second engaging and mating position, and further comprising switch means arranged to be actuated by the contact plate mounting means and to cut off the supply of electrical energy from the contact terminals to said brake and clutch motor means when both of said contact plates are held in said second position.

5. A carriage as defined in claim 4, wherein the rear contact plate is provided with one more electrical supply contact terminal than the front plate, and wherein an extra electrical lead is provided to connect the extra contact terminal to the brake motor means, said extra lead by-passing said switch means, whereby said brake motor means can be activated by way of said one more terminal when both of said contact plates are in said second position.

6. A carriage as defined in cliam 4, wherein said contact plate mounting means comprises two rod members reciprocably mounted in said frame, said rod members extending in the direction of travel of said carriage, one of said rods projecting from the fore side of the carriage and the other of said rods projecting from the aft side of the carriage, said one and said other of the rods carrying said front and rear plates at their outer ends, respectively, and wherein said switch means is connected to the inner ends of said rods.

7. A carriage as defined in claim 2, further comprising a first and a second coupling means fixed to the frame on the fore and aft sides respectively of the carriage, the first coupling means being arranged to engage and become locked with coupling means on another carriage corresponding to said second coupling means, and means carried by said frame arranged to unlock one of said coupling means.

8. A carriage as defined in claim 7, wherein the unlocking means includes an electric motor and wherein said plates each have unlocking motor contact terminals connected by electrical lead lines, said lead lines being arranged to supply electrical energy to the unlocking motor, whereby the unlocking motor can be activated through the unlocking motor contact terminals to unlock the coupling means.

9. A carriage as defined in claim 8, wherein said front and rear contact plates are mounted normal to the direction of travel of the carriage and project from fore and aft sides of the carriage respectively, wherein the contact plates are biased to a first normal position and are movable to a second engaging and mating position, and further comprising switch means arranged to be actuated by said contact plates and to cut off the supply of electrical energy to said brake and clutch motor means and unlocking motor when both of said contact plates are in said second position.

10. A carriage as defined in claim 7, wherein the first coupling means comprises a cylinder mounted to pivot in said frame about a vertical axis, a piston reciprocably mounted in said cylinder, a piston rod fixed to said piston and extending from one end of said cylinder, spring means in said cylinder arranged to urge said piston to a first position, said piston rod being fully extended when said piston is in said first position, a vertical plate member extending in the direction of travel of said carriage, said plate member being arranged to be engaged by the fully extended piston rod and to move piston from its first position against said spring means through said piston rod as said cylinder pivots towards a transverse position, an opening in said plate located to receive the outer end of the piston rod as said piston is urged to its first position when said cylinder is in its transverse position, and wherein said second coupling means comprises a loop projecting from the aft side of the carriage, said loop being arranged to project between the vertical plate and cylinder of an adjacent carriage and to receive the piston rod therethrough when the cylinder of the adjacent carriage is in its transverse position.

11. A carriage as defined in claim 10, wherein the unlocking means comprises a push rod aligned with the opening in said plate member on the opposite side of said plate member to said cylinder, a motor drivingly connected to said push rod and arranged to reciprocate said push rod between first and second positions, said push rod being arranged so that one of its ends projects through said opening when it it in its second position, whereby said piston rod is pushed from said opening by said push rod as said push rod is moved from its first to its second position.

12. A carriage as defined in claim 11, wherein the motor connected to the push rod is an electric motor, wherein both of said contact plates have unlocking motor contact terminals and wherein electrical lead lines connect said terminals and the motor, said lead lines being arranged to supply electrical energy to the motor connected to the push rod.

13. A carriage as defined in claim 10, wherein said cylinder has fixed thereto a substantially vertical rigid finger member, and wherein said loop has fixed to one side thereof a rigid finger member, the finger member on said loop projecting rearwardly and away from said loop and being arranged to engage the rigid finger member on the cylinder of another approaching carriage and pivot that cylinder to its transverse position as said loop receives the piston rod of that cylinder.

14. A carriage as defined in claim 2, comprising a first transversely extending shaft mounted for rotation in said frame, said endless line engaging drum being fixed thereto and a second transversely extending shaft mounted for rotation in said frame substantially below said first shaft, said winch including a loadline drum fixed to the second shaft.

15. A carriage as defined in claim 14, wherein there are two track engaging sheaves located above the endless line engaging drum, said sheaves being aligned and spaced in the direction of travel of the carriage, and wherein said loadline drum is so located with respect to said sheaves that a vertical plane tangent to the periphery of the loadline drum passes through a point substantially midway between the two sheaves.

16. A carriage as defined in claim 15, further comprising a loadline spooler for spooling loadline onto said loadline drum, said spooler being mounted in said frame below said loadline drum and including a framework mounted on tranverse shafts for transversal reciprocating motion, a first pair of spaced parallel transversely extending rollers journalled in said framework, a second pair of spaced parallel rollers journalled in said framework vertically displaced with respect to said first pair and being normal thereto, the rollers of each pair being sufficiently spaced to permit the loadline to pass therebetween, the first pair of rollers being so located with respect to said sheaves that the midpoints between said first pair of rollers and between said sheaves are on a common vertical plane, and drive means connected to and operable by the shaft of said loadline drum and arranged to reciprocate said framework as said shaft rotates.

17. A carriage as defined in claim 14, wherein a first sprocket is mounted for rotation on the first shaft and a second sprocket is fixed to the second shaft, wherein a chain drivingly connects the second sprocket to the first sprocket, and wherein the clutch means includes a clutch member arranged to fasten said first sprocket to said first shaft, whereby upon engagement of said clutch means said loadline drum is driven by said endless line engaging drum in the same direction of rotation as said endless line engaging drum.

18. A carriage as defined in claim 17, further comprising a jack shaft journalled in said frame parallel to said first shaft, a first gear mounted for rotation with said first shaft, a second gear mounted for rotation with said jack shaft and meshing with said first gear, a third sprocket mounted for rotation on said jack shaft, a fourth sprocket fixed for rotation with said second shaft, and a chain drivingly connecting said third and fourth sprockets, and wherein said clutch means includes a second clutch member arranged to fasten said third sprocket to said jack shaft, whereby said loadline drum can be driven by said endless line engaging drum in an opposite direction of rotation as said endless line drum.

19. A carriage as defined in claim 18, wherein said first and second sprockets are of the same diameter and said third and fourth sprockets are of the same diameter, and wherein said second gear is larger than said first gear, whereby the loadline can be let out at a higher rate than it is reeled in for the same speed of rotation of said endless line engaging drum.

20. A carriage as defined in claim 2, further comprising a brake for fixing said winch against rotation with respect to said frame.

21. A carriage as defined in claim 20, wherein a shaft is provided, journalled in said frame, and said winch includes a loadline drum fixed for rotation on the shaft, and wherein said brake includes a first brake member splined to the shaft, a second brake member fixed to said frame, said first brake member being movable between a first position and a second position for interlocking engagement in said second position with said second brake member.

22. A carriage as defined in claim 21 wherein an electric motor is arranged to drive said first brake member between its two positions, wherein said contact plates have contact terminals for the motor, and wherein electrical leads are connected at opposite ends to the terminals for the motor on the two contact plates of the carriage and are arranged to supply electrical energy from the terminals for the motor to the motor.

23. A skyline system comprising an overhead supporting cable, two spaced guide carriages carried by said cable and fixed with respect to the cable substantially above two work areas, an endless drive line having a flight guided parallel to said cable between said guide carriages, a drive motor for circulating said line in either direction, means for providing a supply of electrical energy at both work areas, each of said guide carriages carrying a contact plate having contact terminals thereon, a separate control panel at each work area electrically connected to an arranged to selectively supply electrical energy from the supply to the terminals of the guide carriage thereabove, at least one work carriage mounted for travel on said cable between said guide carriages, said work carriage having an endless line traction drum rotatably mounted therein, said flight of endless line being wound around said drum, a load winch carried by the work carriage and arranged to be driven by said endless line drum as said endless line is circulated, brake means for fixing said drum against rotation, electric motor means for controlling said brake means, contact plate means mounted on the work carriage and arranged to engage the contact plate of either of the guide carriages as the work carriage approaches either of the guide carriages, the contact plate means of the work carriage being provided with contact terminals arranged to mate with preselected contact terminals of the guide carriage contact plates, and electrical lead lines joining the contact terminals of the work carriage contact plates to the brake motor means, whereby the rotation of the drum can be controlled from both work areas.

24. A skyline system comprising an overhead supporting cable, an endless drive line, means supporting a flight of said drive line substantially parallel to said supporting cable, a drive motor for circulating said drive line in either direction, a work carriage mounted for travel on said supporting cable and having an endless line traction drum rotatably mounted therein and engaged with said endless drive line flight, a load winch carried by said work carriage and operably connectable to, so as to be driven by said endless line traction drum, and brake means associated with said drum operable to hold said drum against rotation during travel of said work carriage along said supporting cable, two guide carriages supported by and spaced lengthwise of the overhead supporting cable at opposite sides, respectively, of the work carriage, each of the carriages carrying a contact plate means having terminals thereon for engagement of the terminals of the contact plate means of either guide carriage with the terminals of the contact plate means of the work carriage, means supplying electricity to each of said guide carriages, and means operatively connecting the contact plate means of the work carriage to the brake means for controlling the brake means by electricity supplied to the work carriage from one or the other of the guide carriages.

25. The skyline system defined in claim 24, in which a plurality of said work carriages are carried by the supporting cable between the guide carriages, each work carriage having contact plate means and each having brake means controllable by electricity supplied thereto from a guide carriage through interengaged contact plate means of the carriages.

26. The skyline system as defined in claim 24 wherein one of said guide carriages has an endless line traction drum rotatably mounted therein and engaged with said endless drive line flight and guide carriage brake means associated with said drum, operable to hold said drum against rotation for movement of said one guide carriage along the supporting cable, and said means for supplying electricity is adapted to supply electricity to the guide carriage brake means.

References Cited

UNITED STATES PATENTS

| | | | |
|---|---|---|---|
| 2,359,073 | 9/1944 | Allard | 212—89 |
| 2,601,228 | 6/1952 | Shields | 212—99 |
| 3,336,878 | 8/1967 | Malakhoff | 212—94 |

EVON C. BLUNK, *Primary Examiner.*

H. C. HORNSBY, *Assistant Examiner.*